UNITED STATES PATENT OFFICE.

GEORGE H. WEISS, OF JERSEY CITY, NEW JERSEY, AND EDWARD N. DICKERSON, JR., OF NEW YORK, N. Y.

PURIFYING COCOANUT-OIL.

SPECIFICATION forming part of Letters Patent No. 468,498, dated February 9, 1892.

Application filed May 23, 1889. Serial No. 311,885. (No specimens.)

*To all whom it may concern:*

Be it known that we, GEORGE H. WEISS, of Jersey City, Hudson county, State of New Jersey, and EDWARD N. DICKERSON, Jr., of the city, county, and State of New York, have invented a new and useful Improvement in Purifying Cocoanut-Oil, of which the following is a full, true, and exact description.

Our invention has for its object the deodorization of cocoanut-oil and the production of a white and odorless mass of agreeable taste which is not only of great value to soap-makers, but, being almost identical with the best dairy butter in its chemical composition, may be advantageously used for culinary purposes as a substitute for butter, oleomargarine, &c., either alone or mixed with them, or with lard, &c.

Our invention is based on the following considerations: The peculiar acrid and disagreeable smell and taste of cocoanut-oil are chiefly due to free fatty acids—such as caproic, capric, and caprylic acids—mixed with traces of ethereal oils and esters of these fatty acids. Some of these substances, being volatile, can easily be removed by blowing steam from a boiler into the oil, heating the latter, preferably, to about 120° to 130° centigrade at the same time. The non-volatile fatty acids are transformed into volatile products by one of the processes known in the arts as "etherification," most conveniently and cheapest in this case, by combining the fatty acids with alcohol (methyl-ethyl, &c.) in presence of strong oil of vitriol, the esters thus produced, as well as the former volatile parts, forming valuable by-products.

To carry out the process we proceed as follows: Cocoanut-oil is melted in a steam-jacket iron kettle with agitator and heated to about 130° centigrade, when steam from a boiler is blown into the oil, preferably through the axle of the agitator. The escaping vapors are condensed in the usual manner, the oily layer swimming at the top of the distillate, forming a valuable by-product. After all the volatile products have been driven off and the oil has cooled down to about 40° centigrade a mixture of two parts of methyl or ethyl alcohol and one part of strong oil of vitriol is added. The quantity of alcohol is approximately ascertained by a preliminary test of etherification of the oil. The mixture is vehemently stirred and by means of the steam-jacket kept at a temperature of about 60° to 70° for two hours, when the mass is allowed to settle and the watery layer at the bottom drawn off. A current of steam from a boiler is then passed through the oily part, driving off the newly-formed volatile esters, which are condensed in the usual manner. When all the volatile products are removed and the oil still shows a faint disagreeable smell or taste, it is washed with an equal volume of alcohol of about ninety-five per cent., preferably at a temperature of 35° to 40° centigrade. After settling, the oil is drawn off from the bottom and the alcohol remaining dissolved in the oil distilled off. Finally the oil is heated to 140° centigrade and allowed to cool.

What we claim as our invention, and desire to secure by Letters Patent, is—

1. The process of purifying cocoanut-oil herein described, which consists in, first, treating the cocoanut-oil with steam, and, second, treating it with a mixture of alcohol and sulphuric acid, substantially as described.

2. The process of purifying cocoanut-oil herein described, which consists in, first, treating the cocoanut-oil with steam; second, treating it with a mixture of alcohol and sulphuric acid, and, third, again treating the oily part with steam, substantially as described.

3. The process of purifying cocoanut-oil herein described, which consists in, first, treating the cocoanut-oil with steam; second, treating it with a mixture of alcohol and sulphuric acid; third, again treating the oily part with steam, and, fourth, washing the oil with alcohol, substantially as described.

In testimony whereof we have signed our names to this specification in the presence of two subscribing witnesses.

GEO. H. WEISS.
E. N. DICKERSON, JR.

Witnesses:
ANTHONY GREF,
WM. A. POLLOCK.